May 19, 1959     R. S. GAUGLER     2,887,346

SHAFT BEARING

Filed July 30, 1957

INVENTOR.
Richard S. Gaugler
BY Edwin S. Dybvig

HIS ATTORNEY

United States Patent Office 2,887,346
Patented May 19, 1959

2,887,346

SHAFT BEARING

Richard S. Gaugler, Dayton, Ohio, assignor to General Motors Corporation, Detroit, Mich., a corporation of Delaware Application July 30, 1957, Serial No. 675,143

7 Claims. (Cl. 308—238)

This invention relates to a shaft bearing and more particularly to a shaft bearing utilizing a tubular fabric lining.

It is an object of this invention to provide a shaft bearing which may be manufactured at a low cost.

Another object of this invention is to provide an improved arrangement for holding the fabric in place in a bearing utilizing woven Teflon or the like as a bearing insert.

Still another object of this invention is to provide a low-cost bearing which does not require frequent lubrication during the life of the bearing.

Further objects and advantages of the present invention will be apparent from the following description, reference being had to the accompanying drawings wherein preferred forms of the present invention are clearly shown.

Figure 1:
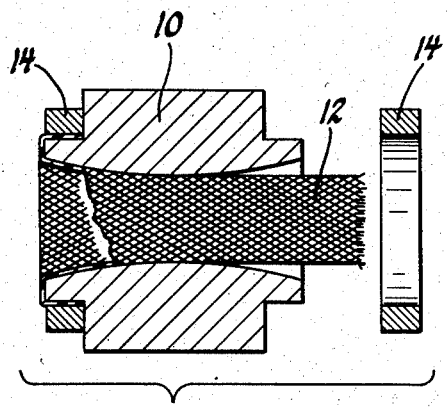
Figure 1 is an exploded sectional view showing a bearing constructed in accordance with the invention.
Figure 2:
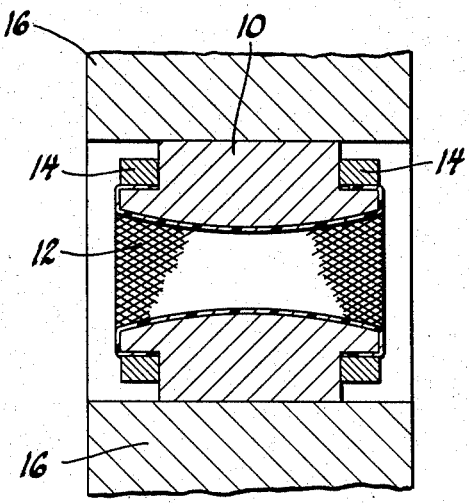
Figure 2 is a sectional view showing the bearing installed in a support.

Referring now to Figures 1 and 2 of the drawings wherein a preferred embodiment of the invention has been shown, a reference numeral 10 generally designates a tubular metallic element which serves as a holder or backing for a braided tubular bearing fabric 12 which extends through the aperture of the element 10 and has its ends folded back over onto the outer ends of the member 10 as shown. The tubular fabric material 12 is preferably woven Teflon which is a synthetic plastic material made from polytetrafluoroethylene. The ends of the woven or braided tubular material 12 are firmly held in place by means of the clamping rings 14 which have a press fit on the ends of the member 10.

In the embodiment shown in Figures 1 and 2 of the drawings the internal diameter of the tubular element 10 is tapered as shown so as to facilitate the insertion of the shaft into the bearing without causing shearing of the woven Teflon. The taper helps to compensate for any misalignment of the bearing support relative to the axis of the shaft supported therein and also provides a relative high bearing pressure throughout only a short length of the bearing. Reference numeral 16 in each instance designates the wall or frame of a device such as an electric motor in which the bearing is supported. The sleeve 10 has a press fit within the frame 16 as shown in Figure 2 of the drawing whereas it may be held in place by any well known means such as a set screw or the like.

Figure 3:
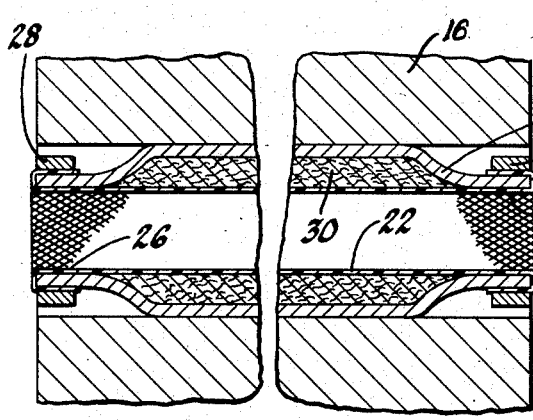
Figures 3 and 4 are sectional views through modified bearing constructions.

In Figure 3 of the drawing there is shown a modified bearing construction in which the tubular element 24 is arranged to provide two spaced bearing areas 26. A braided tubular Teflon bearing fabric 22 is disposed within the tubular element 24 as shown. The ends of the braided fabric 22 are held in place by means of clamping rings 28 which are similar to the rings 14 shown in Figures 1 and 2. By virtue of this construction it is possible to provide a pair of spaced bearings which utilize a single braided tubular insert and to provide lubricant retaining felt or fibrous material 30 in the space provided between the fabric sleeve 22 and the central portion of the tubular element 24. Thus a very inexpensive double bearing element having a life-time supply of lubricant is provided.

Figure 4:
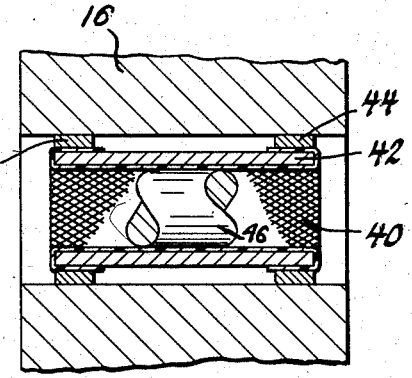

In Figure 4 of the drawings there is shown still another modification wherein the tubular braided bearing fabric 40 is supported by means of a straight tubular portion 42 and wherein the ends of the fabric 40 are held in place by means of rims or rings 44. The elements 42 and 44 may be cut from long lengths of pipe or tubing material. It will be noted that this construction makes it possible to use inexpensive tubular material in making the bearing. In this modification the bearing assembly is held in place in a supporting frame member 46 through the medium of the rings 44. Thus these rings not only serve to fasten the ends of the braided fabric but also serve to mount the bearing assembly within an apertured support. Reference numeral 46 designates the shaft which is adapted to be supported in the bearing.

Figure 5:
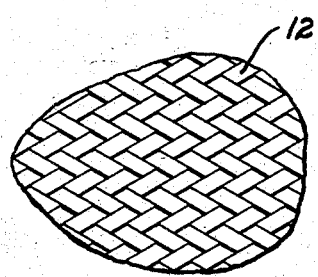
Figure 5 is a fragmentary elevational view on an enlarged scale showing the pattern of the braided portion of the bearings shown in Figures 1 through 4.

In Figure 5 of the drawings there is shown on an enlarged scale the arrangement of the fibers which form the woven bearing material.

Insofar as certain aspects of the invention are concerned, the woven material could be made of strands of nylon, brass, aluminum or any other suitable bearing material.

While the forms of embodiment of the invention as herein disclosed constitute preferred forms, it is to be understood that other forms might be adopted, as may come within the scope of the claims which follow.

What is claimed is as follows:

1. In a bearing construction utilizing woven fabric as a bearing liner, a tubular support, a braided tubular fabric sleeve disposed within said support, the ends of said sleeve being arranged to overlap the outer periphery of said support, and ring means clamping said overlapping ends onto the outer periphery of said support, said tubular support being of reduced internal diameter at spaced points along the central axis thereof so as to provide spaced bearing surfaces.

2. In a bearing construction utilizing woven fabric as a bearing liner, a tubular support, a braided tubular fabric sleeve disposed within said support, the ends of said sleeve being arranged to overlap the outer periphery of said support, and ring means clamping said overlapping ends onto the outer periphery of said support, said tubular support being of reduced internal diameter at spaced points along the central axis thereof so as to provide spaced bearing surfaces, and lubricant absorbing material disposed between said tubular fabric sleeve and portions of said tubular support intermediate said spaced points.

3. A bearing assembly utilizing woven fabric as a bearing liner comprising in combination, a tubular support, a braided tubular fabric sleeve disposed within the central aperture of said support, the ends of said sleeve being arranged to overlap the outer periphery of said support, and ring means clamping said overlapping ends onto the outer periphery of said support, a frame having an aperture therein for receiving said bearing assembly and arranged to frictionally engage said ring means so as to support said bearing assembly in said frame.

4. A bearing assembly utilizing a woven fabric as a bearing liner comprising in combination, a tubular support having an outer peripheral flange for use in supporting said bearing assembly, a braided tubular fabric sleeve disposed within said support, the ends of said sleeve being arranged to overlap the outer periphery of said support, and ring means clamping said overlapping ends onto the outer periphery of said support, said tubular support comprising spaced portions of reduced diameter so as to provide spaced bearing surfaces.

5. A bearing assembly utilizing a woven fabric as a bearing liner comprising in combination, a tubular support having an outer peripheral flange for use in supporting said bearing assembly, a braided tubular fabric sleeve disposed within said support, the ends of said sleeve being arranged to overlap the outer periphery of said support, and ring means clamping said overlapping ends onto the outer periphery of said support, said tubular support comprising spaced portions of reduced diameter so as to provide spaced bearing surfaces, said last named means comprising a pair of end rings having a press fit relative to said support.

6. In a bearing construction utilizing woven fabric as a bearing liner, a tubular support, a braided tubular fabric sleeve disposed within said support, the ends of said sleeve being arranged to overlap the outer periphery of said support, and ring means clamping said overlapping ends onto the outer periphery of said support.

7. A bearing assembly utilizing a woven fabric as a bearing liner comprising in combination, a tubular support having an outer peripheral flange for use in supporting said bearing assembly, a braided tubular fabric sleeve disposed within said support, the ends of said sleeve being arranged to engage the outer ends of said support, and ring means having a press fit relative to said support and clamping said overlapping ends onto the outer ends of said support.

References Cited in the file of this patent

UNITED STATES PATENTS

| | | |
|---|---|---|
| 801,311 | Finning | Oct. 10, 1905 |
| 2,048,247 | Davis | July 21, 1936 |
| 2,188,722 | Geyer | Jan. 30, 1940 |
| 2,354,445 | Grubbs | July 25, 1944 |
| 2,356,027 | Boyd | Aug. 15, 1944 |
| 2,641,828 | Knoblaugh | June 16, 1953 |

FOREIGN PATENTS

| | | |
|---|---|---|
| 548,744 | Great Britain | Oct. 22, 1942 |